Nov. 11, 1958 A. GARLAND 2,860,001
WEED REMOVING TOOLS
Filed Oct. 17, 1956
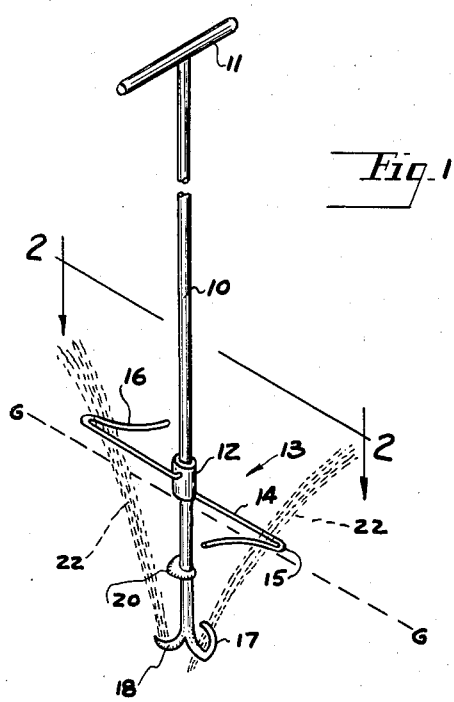
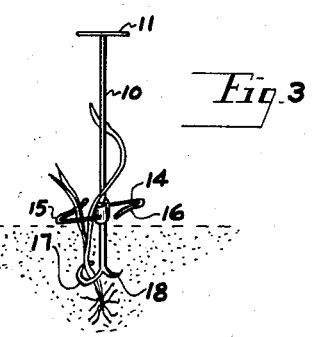
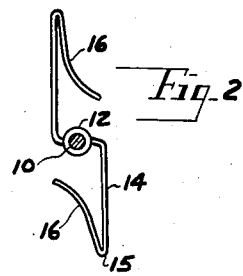
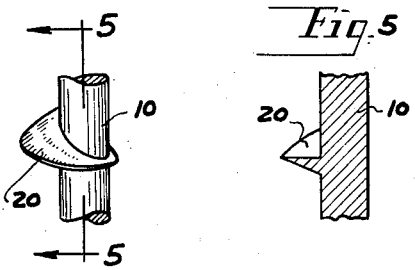
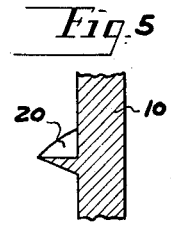
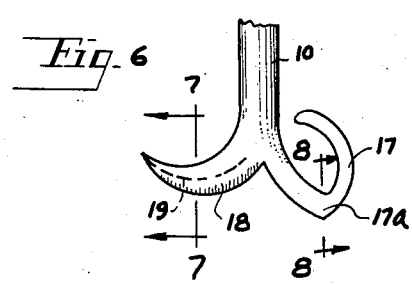
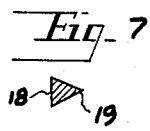
INVENTOR.
ANNA GARLAND
BY
ATTORNEY

2,860,001

WEED REMOVING TOOLS

Anna Garland, Detroit, Mich.

Application October 17, 1956, Serial No. 616,521

2 Claims. (Cl. 294—50.6)

The object of the invention is to provide a hand-operated tool, including a shaft and operative elements at one end thereof for removal of weeds from lawns or flower beds, by pulling said weeds out from the ground. This is effected by having means on said tool to cause the stalks of the weeds to be twisted about the shaft while simultaneously other element or elements will engage the root portions of the respective weed or weeds to crush them, thus aiding in having them pulled up.

A further object of the invention is to provide a tool which will be capable of the above named functions but which will be of very simple structure and yet fully useful for the purposes for which it has been designed.

I shall now describe the tool with reference to the accompanying drawings in which:

Fig. 1 is a perspective view of the tool in its vertical position, the dotted lines in the drawing indicating weeds which are engaged by said tool;

Fig. 2 is a sectional view on line 2—2 of Fig. 1;

Fig. 3 is a side elevational view of the tool in a reduced size, the view disclosing the manner in which the weeds are engaged by the tool;

Fig. 4 is an enlarged side elevational view of a portion of the shaft of the tool, the view disclosing a blade mounted on said shaft;

Fig. 5 is a sectional view on line 5—5 of Fig. 4;

Fig. 6 is a side elevational view of the lower end of the tool;

Fig. 7 is a sectional view on line 7—7 of Fig. 6;

Fig. 8 is a sectional view on line 8—8 of Fig. 6.

Similar numbers refer to similar parts throughout the several figures.

The tool includes a straight shaft 10, which is preferably made of metal, and which, at one end, this being the upper end of the tool, is provided with a cross-bar 11 serving as a handle. Mounted on the shaft in a spaced relation to the other end of the shaft is a collar 12, and projecting therefrom, in diametrically opposite directions, are two hook-shaped members generally identified by numeral 13. Each of the members consists of a rod 14 serving as a shank, which at one end is attached to the collar, the rod being bent upon itself in a tight hairpin turn, as shown at 15, and forming in its continuation, a leg 16, which flares away from said shank 14. Preferably one of the hooks is mounted upon the collar at a level above that of the other hook.

The lower end of the shaft is split along its axis into two elements, one of which describes elongated loop 17 disposed in a substantially vertical plane, the lower portion of the loop forming an arrow shaped head 17a. The other element forms a claw 18. The latter, as seen in cross-section 19, has the form of a wedge provided with a cutting edge, as shown in Fig. 7.

Midway the length of the shaft, between the collar 12 and the claw 18, said shaft is provided with a helical blade 20. The blade may be integrally formed with the shaft, or it may be welded in place. If desired it may be made separately from sheet metal stock and secured by suitable means to the shaft.

The manner in which the tool is to be operated is as follows:

The tool, held in a substantially vertical position, is forced into the ground by pressure upon the handle while at the same time, the shaft is turned clockwise about its axis till the shanks 14 of the hooks 13 are close to the ground, indicated by line G—G.

As the shaft is rotated, the stalks of weeds, marked 22 and rising above the ground, will be gathered by the hooks 13 and will be twisted about the shaft, while the loop 17 and the claw 19 will cut the roots below the ground surface. An upward pull on the shaft, preferably while the shank is still being rotated about its axis, will pull out the weeds.

While the shaft is in the ground, the blade 20 will be of service in cutting stalks immediately adjacent to the shank and the path of the blade during rotation of the shaft. However, I consider the blade but an optional adjunct to my tool.

The twisting of the weed stalks by means of the tool, is illustrated in Fig. 3. As shown there, the portions of the stalks above the ground will be gathered by the hooks 13, and as the stalks are stationary while the hooks rotate about the axis of the shaft, the lower portions of said stalks will be wrapped helically about the shaft and intertwined in the manner of the strands of a loosely formed rope so that they may be easily pulled out of the ground.

After having described my tool, what I wish to claim is as follows:

1. A weed-removing tool comprising a straight shaft which, when viewed in a vertical position, includes, at the lower end, two adjoining elements in a diametrically-opposed relation to each other, one of the elements forming a loop disposed in a vertical plane and being open at the top, said loop having a pointed lower portion, the other element forming a substantially horizontally-disposed blade, two hooks radially extending from the shaft in a spaced relation to the lower end thereof, each hook including a loop flaring outwardly in a horizontal plane, and a handle at the opposite end of the shaft.

2. A weed-removing tool including a straight shaft which, when viewed in a vertical position, includes, at the lower end, a portion looped in a vertical plane and having the lower portion pointed downwardly, a substantially-horizontal blade adjoining said looped portion, two hooks extending radially from the shaft at a level above said looped portion in diametrically-opposed directions, each hook including a loop flaring outwardly in a horizontal plane, and a handle at the upper end of the shaft.

References Cited in the file of this patent

UNITED STATES PATENTS

| 352,736   | Coles  | Nov. 16, 1886 |
| 843,399   | King   | Feb. 5, 1907  |
| 2,194,336 | Tullio | Mar. 19, 1940 |
| 2,492,035 | Doble  | Dec. 20, 1949 |